(12) United States Patent
Shyu et al.

(10) Patent No.: US 7,791,877 B2
(45) Date of Patent: Sep. 7, 2010

(54) PORTABLE APPARATUS INCORPORATING A SOUND OUTPUT DEVICE

(75) Inventors: Ruey-Ching Shyu, Taipei Hsien (TW); Ya-Chi Hsu, Taipei Hsien (TW); Yan-Lin Kuo, Taipei Hsien (TW); Tsan-Sheng Chen, Taipei Hsien (TW); Hsueh-Chih Peng, Taipei Hsien (TW); Hao-Sheng Lo, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 19 days.

(21) Appl. No.: 12/248,840

(22) Filed: Oct. 9, 2008

(65) Prior Publication Data
US 2009/0147468 A1 Jun. 11, 2009

(30) Foreign Application Priority Data
Dec. 11, 2007 (TW) .............................. 96147218 A

(51) Int. Cl.
*G06F 1/16* (2006.01)
(52) U.S. Cl. .................... 361/679.55; 381/382
(58) Field of Classification Search ............ 361/679.55; 381/382
See application file for complete search history.

(56) References Cited
U.S. PATENT DOCUMENTS

| | | | | |
|---|---|---|---|---|
| 5,808,861 A | * | 9/1998 | Nakajima et al. | 361/679.27 |
| 5,917,695 A | * | 6/1999 | Youn | 361/679.27 |
| 6,078,497 A | * | 6/2000 | Derocher et al. | 361/679.55 |
| 6,243,260 B1 | * | 6/2001 | Lundgren et al. | 361/679.23 |
| 6,246,570 B1 | * | 6/2001 | Kim | 361/679.23 |
| 6,262,824 B1 | * | 7/2001 | Sasaki et al. | 398/115 |
| 6,353,529 B1 | * | 3/2002 | Cies | 361/679.05 |
| 6,392,871 B1 | * | 5/2002 | Yanase | 361/679.07 |
| 2002/0044410 A1 | * | 4/2002 | Nakano et al. | 361/681 |
| 2002/0101706 A1 | * | 8/2002 | Shin | 361/683 |
| 2002/0141147 A1 | * | 10/2002 | Ando | 361/684 |
| 2003/0034952 A1 | * | 2/2003 | Wang et al. | 345/156 |
| 2007/0291447 A1 | * | 12/2007 | Nakajima et al. | 361/683 |
| 2008/0253070 A1 | * | 10/2008 | Rissanen et al. | 361/681 |

\* cited by examiner

*Primary Examiner*—Lisa Lea-Edmonds
(74) *Attorney, Agent, or Firm*—Alan Kamrath; Kamrath & Associates PA

(57) ABSTRACT

A portable apparatus includes a display housing, a main housing, and a sound output device. The display housing has a pivot side. The main housing includes a pivot portion that defines a pivot axis and that is coupled to the pivot side of the display housing such that the display housing is pivotable relative to the main housing about the pivot axis. The pivot portion is formed with a receiving space. The sound output device is disposed in the receiving space of the pivot portion and outputs sound in a sound propagating direction substantially parallel to the pivot axis.

11 Claims, 3 Drawing Sheets

PORTABLE APPARATUS INCORPORATING A SOUND OUTPUT DEVICE

CROSS-REFERENCE TO RELATED APPLICATION

This application claims priority of Taiwanese Application No. 096147218, filed on Dec. 11, 2007.

BACKGROUND OF THE INVENTION

1. Field of the Invention

The invention relates to a portable apparatus and, more particularly to a portable apparatus incorporating a sound output device that is disposed at a pivot portion between a display housing and a main housing of the portable apparatus such that the portable apparatus is made more compact.

2. Description of the Related Art

As notebook computers become increasingly popular, in addition to word processing, a growing number of people use notebook computers for listening to music, watching movies and playing games. Therefore, there is a demand for better quality sound output by notebook computers.

U.S. Pat. No. 5,668,882, entitled "notebook computer speakers," discloses a notebook computer including a keyboard housing formed with sound apertures in an underside thereof and including a low frequency speaker disposed in the keyboard housing. In order for low frequency sound outputted by the low frequency speaker to exit the sound apertures, the keyboard housing is provided with four foot parts on the underside thereof, such that the underside of the keyboard housing is spaced apart from a table surface when the notebook computer is in use.

By disposing the low frequency speaker in the keyboard housing, the size of the notebook computer is increased, and the quality of the low frequency sound is adversely affected. In particular, since the current trend is to reduce the size of notebook computers, with the low frequency speaker occupying considerable space in the keyboard housing, placement configurations of other internal components in the keyboard housing are undesirably limited. In addition, when the thickness of the keyboard housing is reduced, there is usually little space left for reflection, refraction or diffraction of the low frequency sound within the keyboard housing before exiting via the sound apertures, thereby adversely affecting the quality of the low frequency sound. Furthermore, the quality of low frequency sound is further adversely affected due to the fact that the sound apertures are located in the underside of the keyboard housing.

To solve this problem, some notebook computers have the low frequency speakers disposed at sides of the keyboard housing. An example is disclosed in Taiwanese Patent Publication No. 580840, entitled "Portable Computer Provided with a low Frequency Speaker". However, the problems of leaving limited space in the keyboard housing for other internal components and of adversely affecting the quality of low frequency sound are still unsolved. Furthermore, the sound propagating direction of the low frequency sound is substantially parallel to a rotation axis of an optical disc player or a hard drive disposed in the keyboard housing. Since the optical disc player or the hard drive is very sensitive to vibrations, reading/writing operations thereof are adversely affected by the low frequency sound.

SUMMARY OF THE INVENTION

Therefore, an object of the present invention is to provide a portable apparatus that includes a sound output device, that is relatively small in size and that enhances quality of sound outputted by the sound output device.

According to the present invention, there is provided a portable apparatus that includes a display housing, a main housing, and a sound output device. The display housing has a pivot side. The main housing includes a pivot portion that defines a pivot axis and that is coupled to the pivot side of the display housing. Thus, the display housing is pivotable relative to the main housing about the pivot axis. The pivot portion is formed with a receiving space. The sound output device is disposed in the receiving space of the pivot portion and outputs sound in a sound propagating direction substantially parallel to the pivot axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
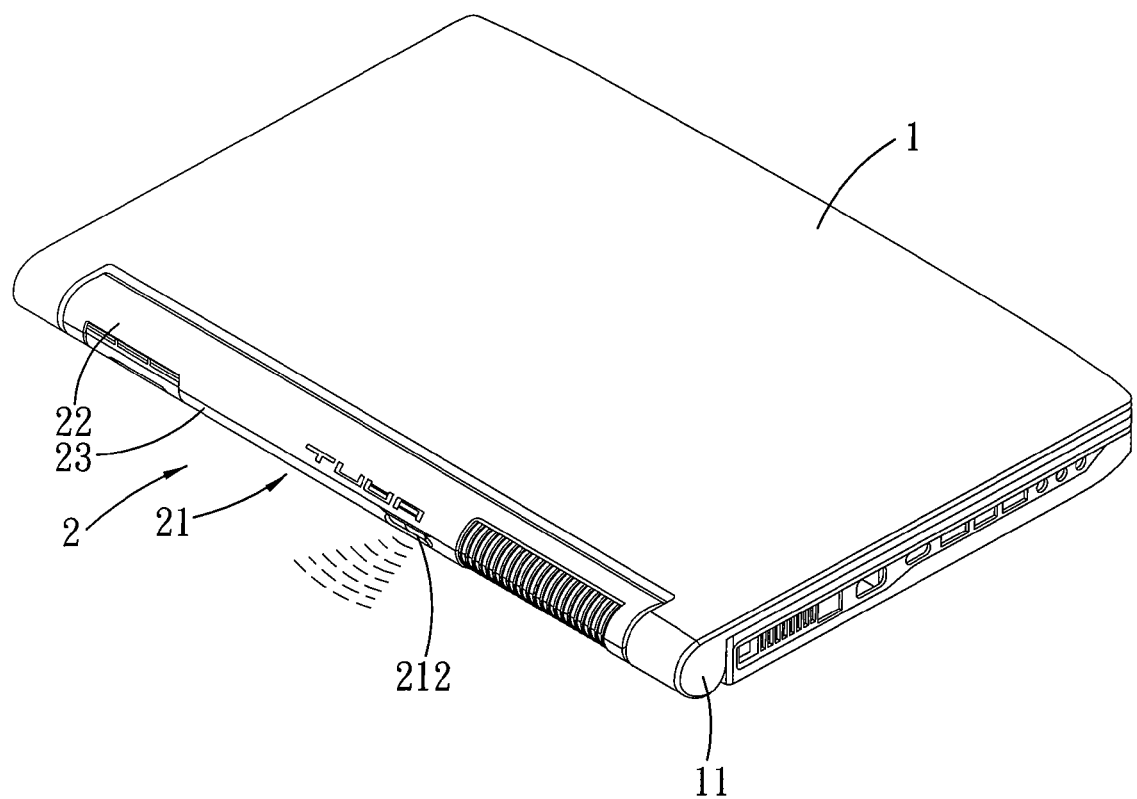
FIG. 1 is a perspective view of the preferred embodiment of a portable apparatus according to the present invention.
Figure 2:
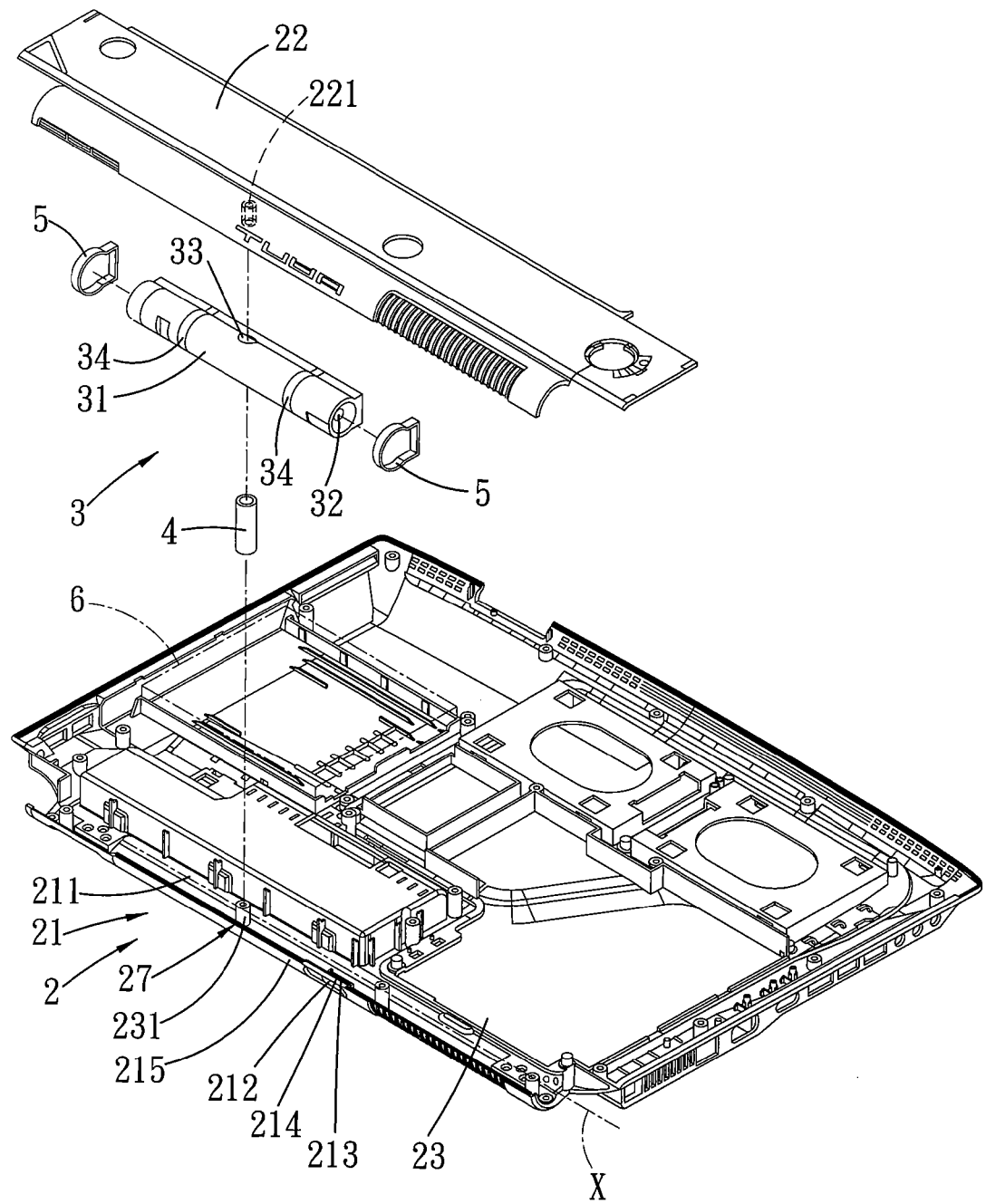
FIG. 2 is a fragmentary exploded perspective view of the preferred embodiment.

As shown in FIG. 1 and FIG. 2, the preferred embodiment of a portable apparatus according to the present invention is embodied in a notebook computer that includes a display housing 1, a main housing 2, and a sound output device 3. The display housing 1 has a pivot side 11. The main housing 2 includes a pivot portion 21 that defines a pivot axis (X). The pivot portion 21 is coupled to the pivot side 11 of the display housing 1 in a conventional manner such that the display housing 1 is pivotable relative to the main housing 2 about the pivot axis (X). The pivot portion 21 is formed with a receiving space 211 for receiving the sound output device 3. The sound output device 3 outputs sound in a sound propagating direction (A) (see FIG. 3) that is substantially parallel to the pivot axis (X) and substantially perpendicular to a vibration-sensitive direction of the portable apparatus.

Figure 3:
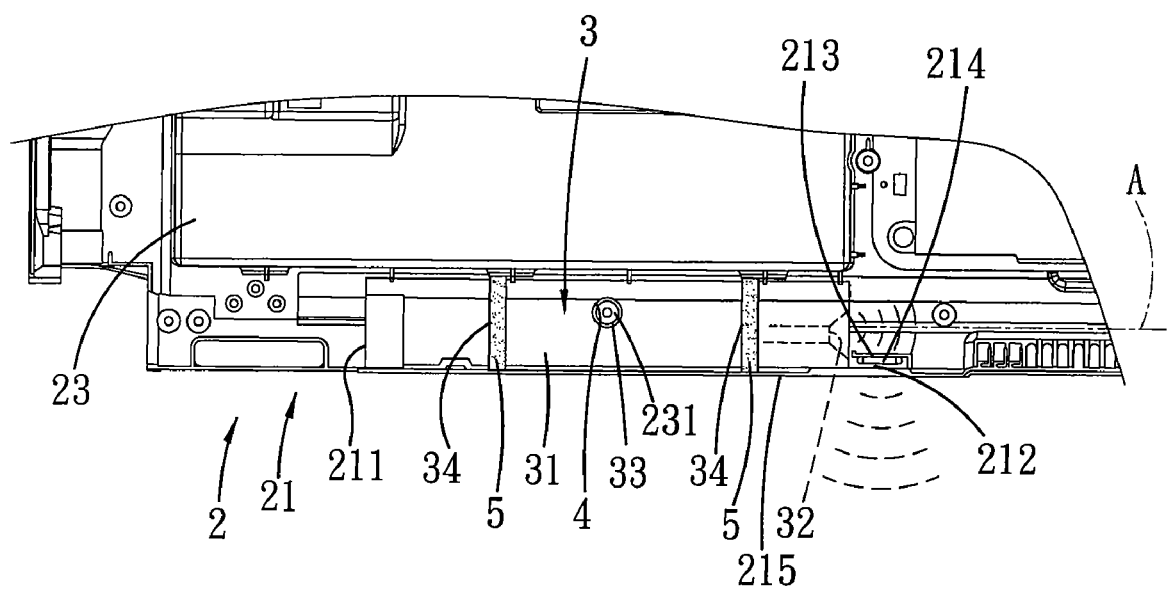
FIG. 3 is a fragmentary schematic top view showing a sound output device, a receiving space and a sound passageway in a main housing of the preferred embodiment.

With reference to FIG. 2 and FIG. 3, in this embodiment, the portable apparatus further includes an optical disc drive 6 disposed in the main housing 2 and having a disc rotation axis that defines the vibration-sensitive direction.

In this embodiment, the pivot portion 21 of the main housing 2 is further formed with an aperture 212 that is in spatial communication with the receiving space 211. The pivot portion 21 is provided with a baffle plate 213 that is disposed in the receiving space 211 and proximate to the aperture 212. The baffle plate 213 cooperates with the aperture 212 to define a sound passageway 214 in spatial communication with the receiving space 211. The sound outputted by the sound output device 3 propagates through the sound passageway 214 and exits the pivot portion 21 via the aperture 212.

In particular, the main housing 2 has opposite front and rear sides. The pivot portion 21 is disposed at the rear side. The pivot portion 21 includes an outer wall 215 formed with the aperture 212 that faces in a rearward direction. The baffle plate 213 is disposed inwardly (i.e., forwardly) of the outer wall 215. The baffle plate 213 has a first end connected to a portion of the outer wall 215 that is proximate to the aperture 212 and has a second end spaced apart from the outer wall 215. The sound passageway 214 is substantially parallel to the pivot axis (X).

In this embodiment, the sound output device 3 is a low frequency speaker that includes an elongated enclosure 31 and an acoustic drive component 32. The elongated enclosure 31 extends substantially parallel to the pivot axis (X). The acoustic drive component 32 is disposed in the elongated enclosure 31 and proximate to the second end of the baffle plate 213. The acoustic drive component 32 generates sound through vibration in the sound propagating direction (A) that is substantially parallel to the pivot axis (X) and substantially perpendicular to the vibration-sensitive direction of the portable apparatus (e.g., the disc rotation axis of the optical disc player 6). Consequently, adverse affect on the optical disc player 6 due to the sound outputted by the sound output device 3 can be minimized.

In this embodiment, the portable apparatus further includes a tubular shock-absorbing member 4 and two annular shock-absorbing members 5. The elongated enclosure 31 of the sound output device 3 is formed with an engaging hole 33 in a center portion thereof and with two annular grooves 34 at two opposite end portions. The tubular shock-absorbing member 4 is received in the engaging hole 33. The annular shock-absorbing members 5 are sleeved on the elongated enclosure 31 of the sound output device 3. The annular shock-absorbing members 5 are disposed respectively in the annular grooves 34 and in contact with the pivot portion 21 of the main housing 2.

The main housing 2 includes an engaging shaft 27 that is engaged with the tubular shock-absorbing member 4 for securing the sound output device 3 in the receiving space 211 of the pivot portion 21.

In this embodiment, the main housing 2 further includes top and bottom halves 22, 23 that cooperate to form the pivot portion 21. Each of the top and bottom halves 22, 23 is provided with an engaging member 221, 231. The engaging members 221, 231 of the top and bottom halves 22, 23 constitute the engaging shaft 27.

The tubular shock-absorbing member 4 and the annular shock-absorbing members 5 absorb vibrations produced by the sound output device 3 during sound generation so as to reduce transfer of the vibrations to the main housing 2 and, in turn, to other internal components of the portable apparatus disposed in the main housing 2.

In addition to the shock-absorbing ability provided by the tubular shock-absorbing member 4 and the annular shock-absorbing members 5, since the sound output device 3 is disposed in the pivot portion 21 of the main housing 2 away from other internal components in the main housing 2, and since the sound propagates in the sound propagating direction (A) that is substantially parallel to the pivot axis (X) and substantially perpendicular to the vibration-sensitive direction of the portable apparatus, adverse affect due to the propagation of sound can be minimized, thereby ensuring proper operation of the other internal components of the portable apparatus.

With the elongated design for the sound output device 3, the elongated enclosure 31 provides sufficient space for accommodation of a low damping material that enhances sound propagating efficiency, for generation of low frequency oscillations, or for installation of other mechanisms that can enhance the quality of low frequency sound.

Since the aperture 212 faces in the rearward direction, when the portable apparatus is in operation, the aperture 212 is kept at a suitable distance from other objects in the environment around the portable apparatus. In particular, when a display screen (not shown) received in the display housing 1 is turned on, an optimal viewing angle is achieved when a pivot angle of the display housing 1 relative to the main housing 2 about the pivot axis (X) falls approximately between 90 to 110 degrees. When the pivot angle is greater than 90 degrees, the pivot portion 21 of the main housing 2 is bound to be kept at a distance away from other objects in the environment. Furthermore, in order to provide better heat dissipation, the portable apparatus is usually placed at a certain distance away from other objects in the environment. Due to the above reasons, the aperture 212 can be kept at a suitable distance from other objects in the environment when the portable apparatus is in operation.

Moreover, since the sound passageway 214 and the sound output device 3 both extend substantially parallel to the pivot axis (X), the sound outputted by the sound output device 3 is easily guided along the sound passageway 214 in the sound propagating direction (A) and eventually exits the pivot portion 21 of the main housing 2 via the aperture 212. In addition, the baffle plate 213 is able to provide resonance for the acoustic drive component 32 of the sound output device 3, thereby enhancing the quality of sound outputted by the sound output device 3.

In sum, the portable apparatus according to the present invention has the following advantages:

1. Since the sound output device 3 is disposed in the receiving space 211 that is formed in the pivot portion 21 of the main housing 2, considerable space is available in the main housing 2 for other internal components of the portable apparatus, thereby making it possible for the main housing 2, and in turn the portable apparatus, to be relatively thin and small in size.

2. Since the aperture 212 formed in the pivot portion 21 of the main housing 2 faces in the rearward direction, since the baffle plate 213 cooperates with the aperture 212 to define the sound passageway 214 for guiding sound out of the main housing 2 in the sound propagating direction (A) that is substantially parallel to the pivot axis (X) and that is substantially perpendicular to the vibration sensitive direction of the portable apparatus, and since the baffle plate 213 enhances resonance of the acoustic drive component 32 of the sound output device 3, the quality of the sound outputted by the sound output device 3 is enhanced.

3. Since the tubular shock-absorbing member 4 and the annular shock-absorbing members 5 are provided in the portable apparatus, it is ensured that the sound output device 3 does not come into direct contact with the main housing 2 and that the vibrations produced by the sound output device 3 during sound generation do not affect normal operation of other internal components disposed in the main housing 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable apparatus comprising,
a display housing having a pivot side;
a main housing including a pivot portion that defines a pivot axis, and that is coupled to said pivot side of said display housing such that said display housing is pivotable relative to said main housing about the pivot axis, said pivot portion being formed with a receiving space; and
a sound output device disposed in said receiving space of said pivot portion, and outputting sound in a sound propagating direction substantially parallel to the pivot axis, wherein said sound output device is formed with an engaging hole, said portable apparatus further comprising a tubular shock-absorbing member that is received in said engaging hole, said main housing including an engaging shaft that is engaged with said tubular shock-absorbing member.

2. The portable apparatus as claimed in claim 1, wherein the sound propagating direction is substantially perpendicular to a vibration-sensitive direction of said portable apparatus.

3. The portable apparatus as claimed in claim 2, further comprising an optical disc drive disposed in said main housing and having a disc rotation axis that defines the vibration-sensitive direction.

4. The portable apparatus as claimed in claim 1, wherein said pivot portion of said main housing includes an aperture in spatial communication with said receiving space, said pivot portion further including a baffle plate disposed in said receiving space and proximate to said aperture and cooperating with said aperture to define a sound passageway in spatial communication with said receiving space, with the sound outputted by said sound output device propagating through said sound passageway and exiting said pivot portion via said aperture.

5. The portable apparatus as claimed in claim 4, wherein said pivot portion of said main housing includes an outer wall formed with said aperture, said baffle plate being disposed inwardly of said outer wall, with said baffle plate having a first end connected to a portion of said outer wall that is proximate to said aperture and a second end spaced apart from said outer wall.

6. The portable apparatus as claimed in claim 4, wherein said main housing has opposite front and rear sides, said pivot portion being disposed at said rear side, said aperture facing in a rearward direction.

7. The portable apparatus as claimed in claim 4, wherein said sound passageway is substantially parallel to the pivot axis.

8. The portable apparatus as claimed in claim 1, wherein said engaging hole is formed in a center portion of said sound output device, said sound output device being further formed with two annular grooves at two opposite end portions, said portable apparatus further comprising two annular shock-absorbing members sleeved on said sound output device and disposed respectively in said annular grooves and in contact with said pivot portion of said main housing.

9. The portable apparatus as claimed in claim 1, wherein said main housing further includes top and bottom halves that cooperate to form said pivot portion, each of said top and bottom halves being provided with an engaging member, said engaging members of said top and bottom halves constituting said engaging shaft.

10. The portable apparatus as claimed in claim 1, wherein said sound output device includes an elongated enclosure and an acoustic drive component disposed in said elongated enclosure.

11. The portable apparatus as claimed in claim 1, wherein said sound output device is a low frequency speaker.

\* \* \* \* \*